H. KAISER.
DRIVING MECHANISM.
APPLICATION FILED JULY 13, 1915.
1,166,764.
Patented Jan. 4, 1916.
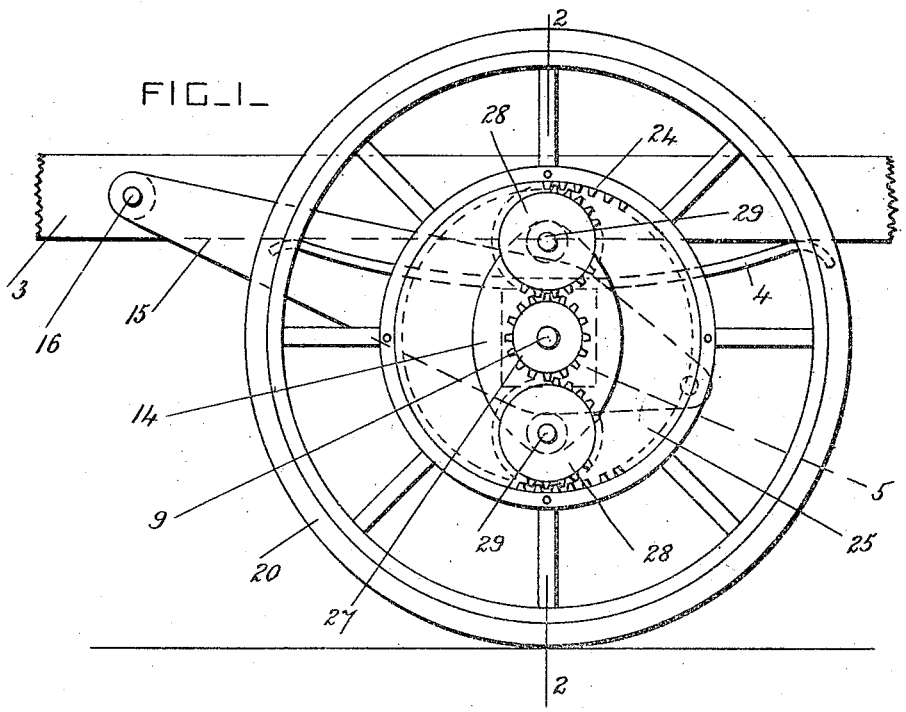
FIG_1_
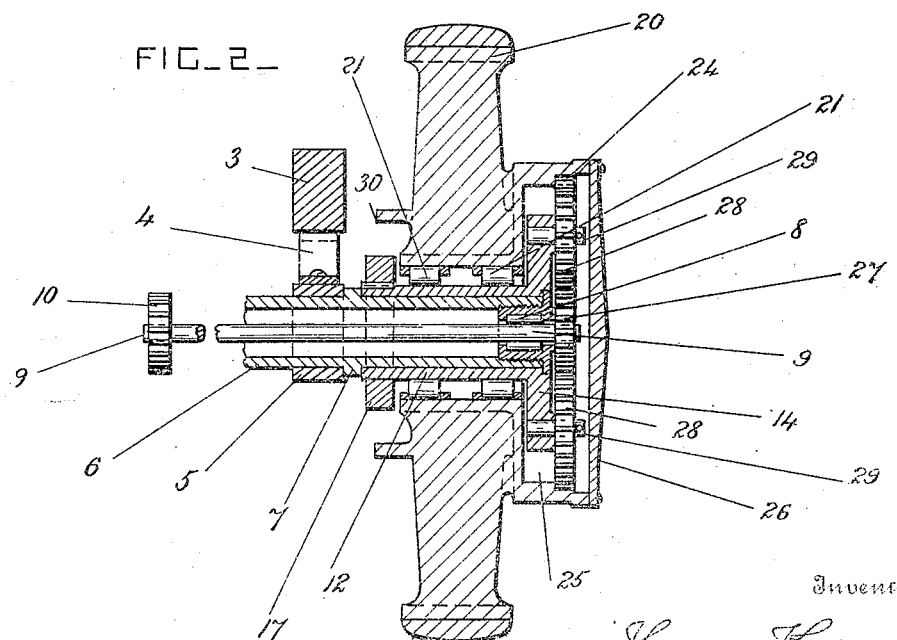
FIG_2_
Inventor
Herman Kaiser,
By Herbert W. D. Jenner.
Attorney

UNITED STATES PATENT OFFICE.

HERMAN KAISER, OF EAST OAKLAND, CALIFORNIA.

DRIVING MECHANISM.

1,166,764.  Specification of Letters Patent.  Patented Jan. 4, 1916.

Application filed July 13, 1915. Serial No. 39,635.

*To all whom it may concern:*

Be it known that I, HERMAN KAISER, a citizen of the United States, residing at East Oakland, in the county of Alameda and State of California, have invented certain new and useful Improvements in Driving Mechanism; and I do hereby declare the following to be a full, clear, and exact description of the invention, such as will enable others skilled in the art to which it appertains to make and use the same.

This invention relates to driving mechanism for motor trucks and cars; and it consists in the novel construction and combination of the parts hereinafter fully described and claimed.

In the drawings, Figure 1 is a front view of the driving mechanism as constructed according to this invention. Fig. 2 is a cross section, taken on the line 2—2 in Fig. 1.

As the driving mechanisms are alike at both sides of the motor truck the description and illustration will be confined to one of them. The frame or body 3 of the truck is provided with a spring 4, a leaf spring being preferably used. A bearing or block 5 is secured to this spring, and 6 is a tubular axle which is secured in the bearing 5, and which does not revolve. This axle has a shoulder or collar 7 which prevents it from moving endwise. A bearing 8 is secured in the end portion of the tubular axle, and is preferably a roller bearing or other antifriction bearing.

A driving shaft 9 is journaled in the bearing 8, and is provided with a driving wheel 10 which is preferably a portion of a compensating gear of approved construction. A sleeve 12 is mounted on the end portion of the tubular axle, and has a plate or disk 14 on its outer end. A radius link 15 is pivoted at its upper end to the car frame 3 by a pin 16, and it has an eye 17 which is keyed on the inner end portion of the sleeve 12, which abuts against the shoulder 7.

A road wheel 20 of any approved make is journaled concentric with the sleeve 12, and 21 are antifriction rollers or other similar devices interposed between the hub of the wheel and the sleeve.

An internal toothed wheel 24 is formed on or secured to one side of the road wheel, and forms a gear casing 25 which is provided with a removable cover 26. A toothed pinion 27 is secured on the end portion of the revoluble shaft 9 inside the gear casing, and 28 are idle toothed wheels journaled on pins 29 which project laterally from the plate or disk 14. The wheels 28 gear into the pinion 27 and into the internal wheel 24, and they transmit the motion of the driving shaft to the road wheels.

The power of the road wheels on the road is transmitted to the truck or car frame by the radius link which is inclined upwardly and forwardly of the axle, and which permits the truck or car frame to move vertically on its supporting spring or springs, and these springs have no strain on them due to the propelling action. The radius link also forms a convenient support for the brake mechanism which is of any approved construction, and which operates on the brake-drum or wheel 30 which projects from the inner side portion of the ground wheel.

The radius link holds the two pinions or idle wheels substantially on the vertical center line of the ground wheel, in which position they are found to drive to the best advantage, and it permits the sleeve to oscillate to a slight extent on the tubular axle to adapt itself to the movements of the supporting spring. The arrangement of the pinions on opposite sides of the center of the ground wheel also distributes the strain on the bearings and less driving power is consequently required.

What I claim is:

1. In a driving mechanism, a car frame, a non-revoluble tubular axle, a spring interposed between the said axle and frame, a driving shaft journaled concentric with the axle, a radius link pivoted at one end to the car frame and operatively connected with the tubular axle, a road wheel journaled concentric with the axle, an internal toothed wheel secured to the road wheel, a toothed pinion secured on the driving shaft, and idle toothed wheels operatively connected with the radius link and gearing into the said internal wheels and the said pinion.

2. In a driving mechanism, a car frame, a non-revoluble tubular axle, a spring interposed between the said axle and frame, a driving shaft journaled concentric with the axle, a sleeve mounted to oscillate on the tubular axle and having a plate on its outer end, a radius link pivoted at one end to the car frame and having an eye which is secured to the inner end portion of the said sleeve, a road wheel journaled concentric with the axle and sleeve, an internal toothed wheel secured to the road wheel, a toothed pinion secured on the driving shaft, and idle toothed wheels supported by the said plate and gearing into the said internal wheel and the said pinion.

In testimony whereof I have affixed my signature.

HERMAN KAISER.